United States Patent [19]
Worrel

[11] Patent Number: 5,307,965
[45] Date of Patent: May 3, 1994

[54] GROUND-DRIVEN TOP DRESSER UTILIZING EASILY ACTUATED CLUTCH MECHANISM

[75] Inventor: Vernon J. Worrel, Mahtomedi, Minn.

[73] Assignee: Turfco Manufacturing, Incorporated, Minneapolis, Minn.

[21] Appl. No.: 983,385

[22] Filed: Nov. 30, 1992

[51] Int. Cl.⁵ ............................................. A01C 15/16
[52] U.S. Cl. ..................................... 222/616; 192/46; 192/67 R; 192/93 R
[58] Field of Search ............... 222/614, 616, 618, 622, 222/623, 624, 625; 192/67 R, 93 R, 40, 41 R, 46

[56] References Cited

U.S. PATENT DOCUMENTS

| | | | |
|---|---|---|---|
| 2,092,104 | 9/1937 | Bowden | 192/93 R X |
| 2,267,415 | 12/1941 | Myers | 192/93 R X |
| 2,630,197 | 3/1953 | Morgenstern | 192/40 |
| 2,658,396 | 11/1953 | Christiance | 192/67 R X |
| 3,161,269 | 12/1964 | Janssen | 192/67 R X |
| 3,429,056 | 2/1969 | Metzger | 192/67 R X |
| 4,438,873 | 3/1984 | Kaercher, Jr. | 222/625 X |

Primary Examiner—Kevin P. Shaver
Attorney, Agent, or Firm—Peterson, Wicks, Nemer & Kamrath

[57] ABSTRACT

A clutch mechanism (88) for a ground-driven top dresser (10) is actuated by an electric actuator (139) pivotally mounted to a U-shaped bracket (104). The shaft (141) of the actuator (139) is connected to flanges (135) radially extending from a rotatable tube (132) through a lost motion means in the form of elongated slots (145) formed in the flanges (135) and which slideably receive a pin (143) carried by the actuator shaft (141). A cam (134) is removably attached to flanges (133) radially extending from the rotatable tube (132) opposite to the actuator flanges (135). The cam (134) has first and second portions (136a,b) for engaging the pivotal arm (110) which engages and disengages the clutch mechanism (88). The spring (96) biasing the jaw members (90, 92) of the clutch mechanism (88) together allows the cam (134) to circumvent the constant velocity extension of the actuator (139) due to the lost motion connection to quickly engage the clutch mechanism (88) when the cam (134) moves to an over-center position from the second portion (136b) to the first portion (136a) of the cam (134).

20 Claims, 2 Drawing Sheets

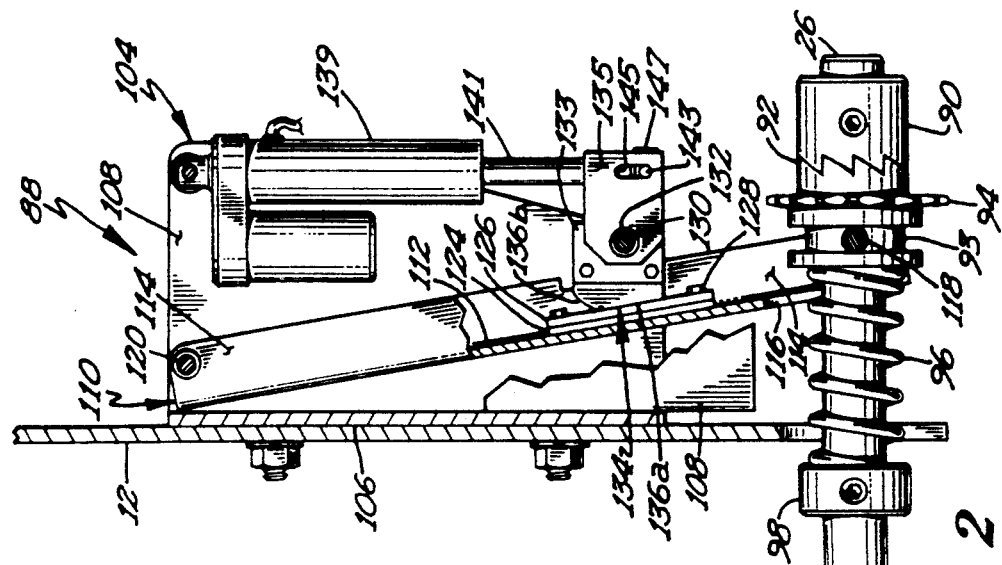
Fig 2
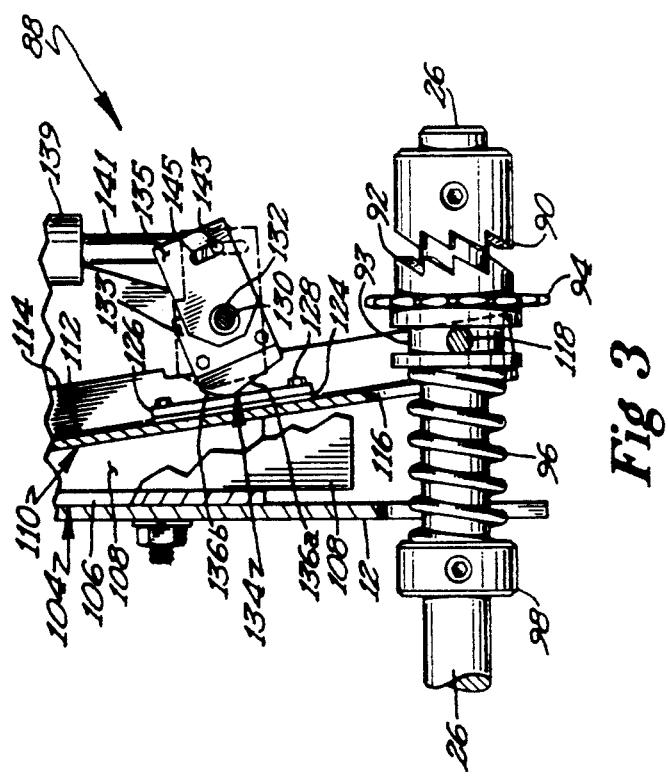
Fig 3
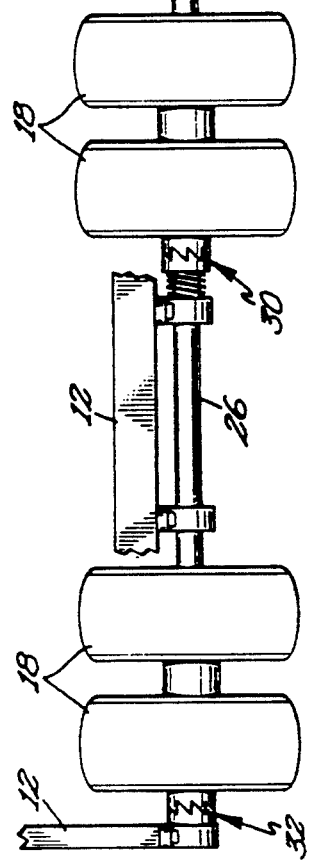

GROUND-DRIVEN TOP DRESSER UTILIZING EASILY ACTUATED CLUTCH MECHANISM

BACKGROUND

The present invention generally relates to an apparatus for dispensing or spreading material, particularly to an apparatus for top dressing terrain, and specifically in a most preferred form to an improved clutch mechanism which can be utilized in ground-driven top dressers.

Various apparatus exist for applying top dressing to the turf of golf courses, lawns, football, baseball and soccer fields, parks, recreational areas, and the like, for applying calcined clay on baseball diamonds, for sanding icy sidewalks and driveways, and for like applications of a ribbon of material at a preselected rate. An example of one of such apparatus is shown in U.S. Pat. No. 4,438,873 which has been widely and very successfully marketed under the trademark TURFCO METER-MATIC. With the increasing awareness of the importance of top dressing in turf management, an increasing need exists for improved dispensers to allow the effective, efficient application of material with increased ease of operation.

In this regard, the clutch mechanism of U.S. Pat. No. 4,438,873 required the operator to pull a rope to either engage or to disengage the jaw members. As the clutch mechanism is engaged at the start of each pass and disengaged at the completion of each pass, many operators were bothered by sore shoulders at the end of their work day from pulling on the rope so many times. Thus, a need exists for a clutch mechanism allowing ease of actuation with reduced manual exertion.

Further, it was necessary for the operator to look back at a rod member located on the top dresser to determine whether the clutch mechanism was engaged or disengaged. This required the operator to momentarily divert attention from watching the forward movement of the pulling vehicle. Thus, a need exists for a clutch mechanism providing the operator with immediate instructions of the condition of the clutch mechanism without requiring the operator to turn to look back at the top dresser.

Additionally, due to success of marketing of such top dressers including rope-actuated clutch mechanisms, a need exists to allow conversion of such clutch mechanisms from the prior rope actuation to electric actuation, with such conversion being simple to make and economical.

Further, a need exists for an improved clutch mechanism having fewer number of parts and which is easier to manufacture and maintain.

SUMMARY

The present invention solves these needs and other problems in the actuation of a clutch mechanism by providing, in the preferred form, rotation of a cam from a first position to a second position in a first direction and then back to the first position in the opposite direction, with the cam including a first portion which engages a pivotal arm to engage the clutch mechanism in the first position and including a second portion which engages the pivotal arm to disengage the clutch mechanism in the second position.

In a preferred aspect, the cam is rotated by an input moving at a relatively constant velocity which in the most preferred form is an electric actuator, with the input connected to the cam allowing the cam to pivot about the cam axis at a variable velocity to quickly engage and disengage the clutch mechanism which in the most preferred form is accomplished by a lost motion means.

It is thus an object of the present invention to provide a novel clutch mechanism.

It is further an object of the present invention to provide such a novel clutch mechanism which is easily actuated with reduced manual exertion.

It is further an object of the present invention to provide such a novel clutch mechanism providing indication to the operator of the clutch position generally without diverting attention from machine operation.

It is further an object of the present invention to provide such a novel clutch mechanism which is simple and economical to manufacture and maintain.

It is further an object of the present invention to provide such a novel clutch mechanism which can be retrofitted in existing mechanisms.

It is further an object of the present invention to provide such a novel clutch mechanism including reduced number of parts.

It is further an object of the present invention to provide such a novel clutch mechanism including very fast engagement and disengagement utilizing a relatively constant velocity input.

It is further an object of the present invention to provide such a novel clutch mechanism especially adaptable for ground driven devices.

It is further an object of the present invention to provide such a novel clutch mechanism especially adaptable for top dressers.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows a partial, cross-sectional view of the clutch mechanism of FIG. 1 according to section line 2—2 of FIG. 1 with the clutch mechanism in an engaged condition.

FIG. 3 shows a partial, cross-sectional view of the clutch mechanism of FIG. 1 with the clutch mechanism being moved from its disengaged towards its engaged condition, with the clutch mechanism being shown in its over-center position in phantom.

Figure 1:
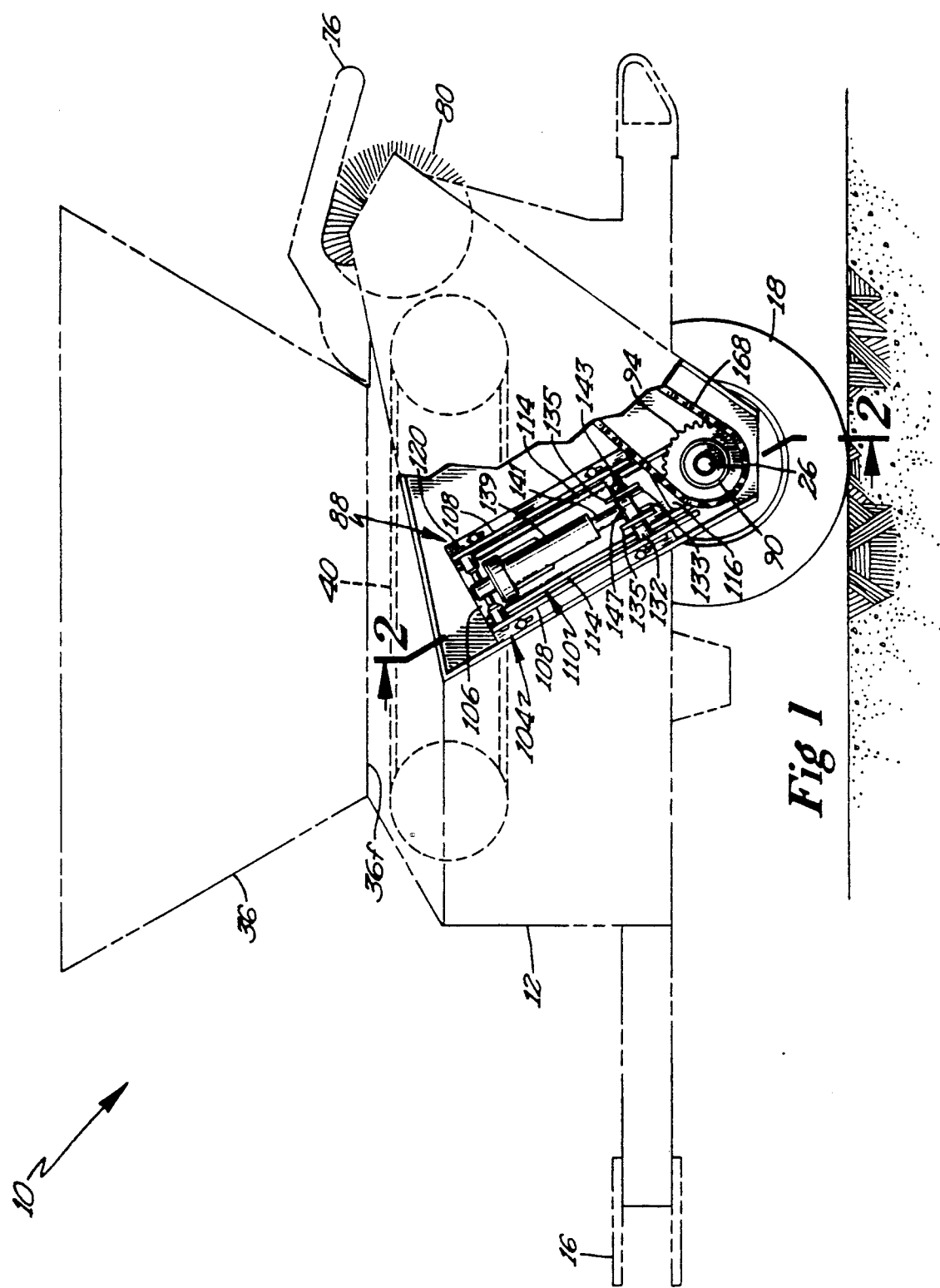
FIG. 1 shows a side view of a top dresser utilizing a novel clutch mechanism according to the preferred teachings of the present invention, with portions shown in phantom.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "front", "back", "outer", "inner", "upper", "lower", "height", "width", "end", "side", "horizontal", "vertical", "longitudinal", "lateral", and similar terms are used herein, it should be understood that these terms have reference only to the structure shown in the drawings as it would appear to a person viewing the drawings and are utilized only to facilitate describing the invention.

DESCRIPTION

A clutch mechanism according to the preferred teachings of the present invention is shown in the drawings and generally designated 88. For purpose of explanation, clutch mechanism 88 has been shown for use in a top dresser 10 of the type shown and described in U.S. Pat. No. 4,438,873. For purpose of explanation of the basic teachings of the present invention, the same numerals designate the same or similar parts in the present figures and the figures of U.S. Pat. No. 4,438,873. The description of the common numerals, top dresser 10, and clutch mechanism 88 may be found herein and in U.S. Pat. No. 4,438,873, which is hereby incorporated herein by reference.

Clutch mechanism 88 is comprised of a first jaw member 90 that is fixedly attached to shaft 26 that is driven via overriding clutches 30, 32 as wheels 18 in which support the frame 12 for movement across the ground. A second jaw member 92 belonging to clutch mechanism 88 is slideably and rotatably disposed on shaft 26, member 92 having a sprocket 94 integral therewith. It will be discerned that a biasing coil spring 96 encircles shaft 26, spring 96 reactively bearing against a collar 98 axially secured to shaft 26. More will be said presently concerning the specific manner in which coil spring 96 biases clutch mechanism 88 into its engaged condition.

Playing a role in the disengagement of clutch mechanism 88 is a U-shaped bracket 104 having web portion 106 and parallel side walls 108. Literally nested between side walls 108 is a channel-shaped arm 110 having a web 112 and side flanges 114. There is a semicircular notch 116 adjacent the bottom edge of web 112 so that the lower end portions of side flanges 114 in effect straddle shaft 26. Each flange 114 has a pin 118 extending therethrough. A pivot pin 120 mounts channel-shaped arm 110 for pivotal movement, the ends of pin 120 being anchored in side walls 108 of U-shaped bracket 104. A shim 124 and a wear plate 126 are secured to web 112 of arm 110 by means of screws 128.

A shaft 130 is supported in side walls 108. Encircling shaft 130 is a tube 132 on which is integrally mounted first and second, spaced, flanges 133 extending in a first radial direction and third and fourth, spaced, flanges 135 extending in the opposite radial direction from flanges 133. Cam 134 is secured to and between flanges 133 and has two portions 136a and 136b extending at an obtuse angle to each other. In the most preferred form, portion 136a is flat whereas portion 136b is curved. Portion 136a is spaced from tubular shaft 132 at a radial distance somewhat less than the radial distance of portion 136b. Tube 132 and flanges 133 pivotally mount cam 134 about a cam axis defined by shaft 130 between a first position and a second position.

As can be appreciated from FIG. 2, clutch mechanism 88 is engaged in this view with cam 134 in the first position. This is by reason of portion 136a, which is not far from the center of rotation of cam 134 as portion 136b, and which enables arm 110 to pivot sufficiently in a counterclockwise direction as viewed in FIG. 2 to effect engagement of jaw member 92 under the influence of spring 96, the right end of spring 96 bearing against the left side of jaw member 92. The inwardly projecting portions of pins 118 mounted in flanges 114 of pivotal arm 110 extend into a circumferential groove 93 formed in member 92. In this way, when coil spring 96 is permitted to expand, the teeth on the face of clutch member 92 mesh with the teeth on the face of clutch member 90. This causes sprocket 94, being integral with clutch member 92, to rotate when wheels 18 rotate. By pivoting tube 132 on shaft 130 to move cam 134 in a counterclockwise direction from the first position to the second position, portion 136b on cam 134 will be brought into juxtaposition with wear plate 126. Inasmuch as portion 136b is spaced a greater distance from the axis of rotation of cam 134, it follows that arm 110 will be urged in a clockwise direction to compress coil spring 96, withdrawing clutch member 92 from the other clutch member 90 of clutch mechanism 88. Sprocket 94, when clutch mechanism 88 is disengaged as can be seen in FIG. 3 and as just described, will not rotate under these circumstances as wheels 18 rotate. It will be appreciated that pins 118, being mounted in flanges 114 of arm 110, shift clutch member 92 in accordance with the cam actuated movement of arm 110 in that the inner ends of pins 118 extend into groove 93 formed in the cylindrical surface of clutch member 92, as previously explained.

The manner in which cam 134 is pivoted so as to shift portions 136a and 136b is by input means which extends and contracts in a linear direction at a constant linear velocity and particularly by an electric actuator 139 in the most preferred form. Actuator 139 is located and pivotally supported between side walls 108. The free end of shaft 141 of actuator 139 is slideably and pivotally mounted to flanges 135 by a pin 143 extending through elongated slots 145 formed in flanges 135 and through apertures formed in a slide collar 147 and the free end of shaft 141, with collar 147 being slideably received on the free end of shaft 141. It can then be appreciated that shaft 141 of actuator 139 is connected to flanges 135 through a lost motion means in the form of pin 143 moving in elongated slots 145.

Jaw members 90 and 92 should be disengaged and engaged by arm 110 in a short period of time in order to prevent wear on jaw members 90 and 92 and also to ensure that jaw members 90 and 92 are either fully engaged or totally disengaged. If jaw members 90 and 92 do not engage fully, they will transmit all the forces from traction wheels 18 on less than the correct amount of area. This lesser area will increase the unit pressure on jaw members 90 and 92 making them subject to early failures. For this reason, spring 96 is used to apply an axial force against jaw member 92 pushing it into engagement at a velocity that insures full contact of the two jaw members 90 and 92.

Specifically, when cam 134 is moved by actuator 139, it moves slowly because actuator 139 itself is a slow moving mechanism. The movement of actuator 139 comes from a small electric motor 149 and a gear train 151 that rotates a threaded portion of actuator shaft 141 pushing it outwardly or inwardly. The speed of actuator shaft 141 is not compatible with the speed of engagement required for clutch mechanism 88. In order to overcome this difference in speed, slots 145 allow cam 134 to be moved by the pressure of spring 96 and circumvent the action of the actuator shaft 141. Jaw members 90 and 92 can be engaged with an increased velocity from the force imparted to it by spring 96 rather than to wait for the slower moving electric actuator shaft 141 to put the two jaw members 90 and 92 into full engagement. Particularly, when moving cam 134 in a counter-clockwise direction in FIG. 3 from the second position to the first position, pin 143 will move to a forward position in slots 145 when electric actuator 139 is switched on such that with further extension of shaft 141, arm 110 moves forward However, when cam 134 reaches an over-center position between portions 136a and 136b, cam 134 will quickly move forward under the bias of spring 96 to its first position with flanges 135 sliding relative to pin 143 which ends up at the rear of slots 145 as shown in phantom in FIG. 3. Thus, jaw members 90 and 92 of clutch mechanism 88 are engaged quickly. After cam 134 has moved to its first position, actuator shaft 141 can continue and complete its extension cycle at its own speed such that pin 143 extends forward in slots 145 as shown in FIG. 2 and be ready for the next action.

On the return stroke or disengagement phase with cam 134 moving in an opposite, counter-clockwise direction in FIG. 2 from the first position to the second position, electric actuator 139 is reversed and pin 143 in electric actuator shaft 141 must travel the length of slots 145 and abut with the back end of slots 145 before any action is started to move cam 134 and thus start the disengagement process. This, in effect, allows the disengagement cycle to be shortened so jaw members 90 and 92 can be separated more rapidly than if they were required to follow the movement of actuator shaft 141 through the full length of its stroke. The disengagement cycle is smoother and the force needed from actuator 139 is constant utilizing a curved portion 136b rather than moving onto a flat. Also, the movement of actuator 139 is also less dependent on stopping at a certain point in the stroke of shaft 141 when portion 136b is curved and not flat because any point on the curve provides a satisfactory end position for the proper disengagement of jaw members 90 and 92.

A chain 168 is entrained about sprocket 94 and extends upwardly and is in driving relationship with suitable drives for conveyor 40 and rotary bristled brush 80. Hence, whenever clutch mechanism 88 is engaged and top dresser 10 is being pulled or towed across the ground, then both conveyor 40 and brush 80 are placed in operation. On the other hand, when clutch mechanism 88 is disengaged, which occurs when portion 136b, having a greater radial distance than portion 136a, is bearing against wear plate 126 fixedly attached to web 112 of pivotal arm 110, then coil spring 96 is compressed, its biasing action being overcome, with the result that clutch mechanism 88 is disengaged, as illustrated in FIG. 3 with the consequence that conveyor 40 and brush 80 do not operate at this time.

Having presented the foregoing description, the manner in which top dresser 10 functions should be readily understood. Nonetheless, in order that the benefits to be derived from a practicing of the present invention may be fully appreciated a brief operational sequence will be given.

Assuming that top dresser 10 has been coupled to a utility vehicle via a hitch component 16, top dresser 10 is towed to a loading site. Even though the hopper 36 surmounting frame 12 is empty, the grounds keeper will normally not wish conveyor 40 and brush 80 to be operational. With clutch mechanism 88 disengaged, top dresser 10 can be pulled at a relatively high speed.

When the loading station is reached, hopper 36 can be rapidly filled with soil, sand, a mixture thereof, or whatever material is to be applied to the particular turf to be treated. Once loaded, top dresser 10 can be towed to where the material is to be distributed or spread. Transport speeds of eight miles per hour and more have been reached, in excess of the four to eight miles-per-hour speeds employed when top dresser 10 is actually being used to dispense the material onto the ground. The rapid loading and the rapid movement to and from loading sites renders top dresser 10 especially efficient and versatile.

When the area to be dressed is reached with top dresser 10, the operator actuates electric actuator 139 to extend to move cam 134 from the second position to the first position as shown in FIG. 3. It should be noted that although electric actuator 139 extends at a relatively constant linear velocity, the engagement cycle of clutch mechanism 88 is shortened due to the connection of shaft 141 to flanges 135 by the lost motion means, which allows cam 134 to be moved by spring 96 when cam 134 reaches an over-center relation between portions 136a and 136b and circumvents the action of actuator shaft 141 as shown in phantom in FIG. 3.

With clutch mechanism 88 engaged as shown in FIG. 2, sprocket 94 rotates when wheels 18 rotate. Rotation of sprocket 94 causes conveyor 40 and rotary brush 80 to be driven. The height or thickness of the ribbon of material moved by conveyor 40 from hopper 36 and upon the ground as top dresser 10 is pulled can be varied by adjusting handle 76 to thereby adjust the amount the gate on hopper 36 is open.

When it is desired to stop top dressing, the operator actuates electric actuator 139 to contract to move cam 134 from the first position as shown in FIG. 2 to the second position in a direction opposite the direction cam 134 moves to engage clutch mechanism 88. It should be noted that due to the connection of shaft 141 to flanges 135 by the lost motion means, the disengagement cycle of clutch mechanism 88 is shortened although electric actuator 139 retracts at a relatively constant linear velocity. With clutch mechanism 88 disengaged, top dresser 10 can be pulled to the next area to be top dressed or to the loading station In the most preferred form, cam 134 is hardened and rides against a hardened wear plate 126 resulting in long wear and reduced friction between the two parts Cam 134 is made as a separate part to allow replacement after a time of use at a minimal cost. Wear plate 126 is also replaceable, with shims 124 used as an adjustment means to vary the clearance between cam 134 and arm 110 assuring that jaw members 90 and 92 engage and disengage properly and with the correct amount of operating clearance between them.

In the most preferred form, actuator 139 and thus clutch mechanism 88 operates from the power of a 12 volt battery in the pulling vehicle for top dresser 10. This provides for a fully charged battery to be available at all times for clutch operation. The operator is required only to manually push a rocker or toggle switch which is attached to a long cord and can be available to the operator by laying in the operator's lap while riding the pulling vehicle. The switch is marked with "on/off"

positions giving the operator immediate instructions as to the position of clutch mechanism 88.

It can be appreciated that the actuation device of clutch mechanism 88 of the present invention includes fewer number of parts and is easier to manufacture and maintain than the actuation device of the type shown in U.S. Pat. No. 4,438,873. Additionally, in the most preferred form, actuator 139 and shaft 132 and the parts carried thereby are designed for easy replacement in prior clutch mechanisms 88 of the type shown in U.S. Pat. No. 4,438,873 now in use in the field. Such replacement is relatively simple to make and relatively inexpensive.

Although in the preferred form slots 145 are formed in flanges 135 and pin 143 is carried by shaft 141, it can be appreciated that lost motion can be provided between cam 134 and actuator 139 by other means such as but not limited to a reversal of connections where a slot is formed in shaft 141 which slideably receives a pin carried by flanges 135.

Although the actuation device of clutch mechanism 88 has been shown and explained in use in top dresser 10 according to the preferred teachings of the present invention, clutch mechanism 88 according to the teachings of the present invention can be utilized in other environments including but not limited to ground-driven devices.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Top dresser adapted to be pulled across the ground comprising, in combination: a frame; wheel means beneath the frame for supporting the frame for movement across the ground; a hopper surmounting the frame having an open bottom; conveyor means disposed beneath the open bottom of the hopper; a shaft rotatable by said wheel means; a clutch mechanism for connecting the shaft to the conveyor means, with the clutch mechanism having an engaged condition and a disengaged condition; a pivotal arm for changing the clutch mechanism between the engaged and disengaged condition; and a clutch actuation device comprising, in combination: a cam having first and second portions extending at an obtuse angle to each other; means for pivotally mounting the cam about a cam axis between a first position and a second position, with the first portion engaging the pivotal arm in the first position and the second portion engaging the pivotal arm in the second position, with the second portion being radially spaced from the cam axis a greater distance than the first portion is radially spaced from the cam axis; and means for rotating the cam to move from the first position to the second position in a first direction and then back to the first position in the opposite direction.

2. The top dresser of claim 1 wherein the pivoting means comprises, in combination: means for providing an input at a relatively constant velocity; and means for connecting the input providing means to the cam allowing the cam to pivot about the cam axis at a variable velocity faster than the velocity of the input to quickly move the clutch mechanism from the disengaged condition to the engaged condition.

3. The top dresser of claim 2 further comprising, in combination: a shaft beneath the frame, with the wheel means located on the shaft and rotatable therewith, with the clutch mechanism including a first clutch member secured to the shaft and a second clutch member movable along the shaft, with the pivotal arm being connected to the second clutch member for moving the second clutch member on the shaft 4. The top dresser of claim 3 further comprising, in combination: means for biasing the second clutch member to engage the first clutch member.

5. The top dresser of claim 2 wherein the connecting means comprises, in combination: an elongated slot formed in one of the cam and the input providing means; and a pin attached to the other of the cam and the input providing means for slideable receipt in the slot 6. For use in a clutch mechanism including a first member, a second member, with the second member being movable between an engaged condition with the first member and a disengaged condition with the first member, and a pivotal arm for moving the second member between the first and second conditions; a clutch actuation device comprising, in combination: a cam having first and second portions extending at an obtuse angle to each other; means for pivotally mounting the cam about a cam axis between a first position and a second position, with the first portion engaging the pivotal arm in the first position and the second portion engaging the pivotal arm in the second position, with the second portion being radially spaced from the cam axis a greater distance than the first portion is radially spaced from the cam axis; and means for pivoting the cam to move from the first position to the second position in a first direction and then back to the first position in the opposite direction.

7. The clutch mechanism of claim 6 wherein the pivoting means comprises an actuator including a shaft which is extendable and contractable in a linear direction.

8. The clutch mechanism of claim 7 wherein the shaft of the actuator is extendable and contractable at a constant linear velocity.

9. The clutch mechanism of claim 8 wherein the pivoting means further comprises, in combination: means for connecting the actuator to the cam allowing the cam to pivot about the cam axis at a variable velocity faster than the velocity of the shaft to quickly move the second member from the disengaged condition to the engaged condition.

10. The clutch mechanism of claim 9 wherein the pivoting means further comprises, in combination: means for providing lost motion between the actuator and the cam.

11. The clutch mechanism of claim 10 wherein the lost motion providing means comprises, in combination: an elongated slot formed in one of the cam and the actuator; and a pin attached to the other of the cam and the actuator for slideable receipt in the slot.

12. The clutch mechanism of claim 11 further comprising, in combination: means for biasing the second member from the disengaged condition to the engaged condition.

13. The clutch mechanism of claim 6 wherein the pivoting means comprises, in combination: means for providing an input at a relatively constant velocity; and means for connecting the input providing means to the cam allowing the cam to pivot about the cam axis at a variable velocity faster than the velocity of the input to quickly move the second member from the disengaged condition to the engaged condition.

14. The clutch mechanism of claim 13 further comprising, in combination: means for biasing the second member from the disengaged condition to the engaged condition.

15. The clutch mechanism of claim 13 wherein the connecting means comprises, in combination: an elongated slot formed in one of the cam and the input providing means; and a pin attached to the other of the cam and the input providing means for slideable receipt in the slot.

16. The clutch mechanism of claim 13 wherein the means for connecting the input providing means to the cam comprises, in combination: a tube pivotally mounted about the cam axis, with the pivotal arm being pivotable about an arm axis which is parallel to and spaced from the cam axis, with the cam extending radially from the tube; at least a first flange extending from the tube radially opposite to the cam; and means for connecting the input providing means to the flange.

17. The clutch mechanism of claim 16 wherein the means for connecting the input providing means to the flange comprises, in combination an elongated slot formed in one of the flange and the input providing means; and a pin attached to the other of the flange and the input providing means for slideable receipt in the slot.

18. The clutch mechanism of claim 16 further comprising, in combination: means for replaceably mounting the cam to the tube, with the cam being formed of hardened material for reduced wear.

19. The clutch mechanism of claim 18 wherein the replaceably mounting means comprises, in combination a second flange extending from the tube radially opposite to the first flange; and means for removably attaching the cam to the second flange.

20. The clutch mechanism of claim 13 wherein the input means comprises an electric actuator which is extendable and contractable in a linear direction.

* * * * *